US008719254B2

(12) United States Patent
Yang et al.

(10) Patent No.: US 8,719,254 B2
(45) Date of Patent: May 6, 2014

(54) EFFICIENT QUERYING USING ON-DEMAND INDEXING OF MONITORING TABLES

(75) Inventors: Jinlin Yang, Redmond, WA (US); Michael Y. Levin, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/327,691

(22) Filed: Dec. 15, 2011

(65) Prior Publication Data

US 2013/0159281 A1    Jun. 20, 2013

(51) Int. Cl.
*G06F 17/30* (2006.01)
(52) U.S. Cl.
CPC .................. *G06F 17/30312* (2013.01)
USPC .......................................... 707/715
(58) Field of Classification Search
CPC .................. G06F 17/30864; G06F 17/300321; G06F 17/303012; G06F 17/30339
USPC ................................. 707/713–715
See application file for complete search history.

(56) References Cited

U.S. PATENT DOCUMENTS

| 5,893,088 | A | 4/1999 | Hendricks et al. | |
|---|---|---|---|---|
| 6,941,312 | B1 | 9/2005 | Hoffman et al. | |
| 6,965,891 | B1 * | 11/2005 | Jakobsson et al. | 707/714 |
| 7,509,332 | B1 * | 3/2009 | Milby | 1/1 |
| 7,945,569 | B2 | 5/2011 | Drory et al. | |
| 2003/0069902 | A1 * | 4/2003 | Narang et al. | 707/203 |
| 2007/0130171 | A1 * | 6/2007 | Hanckel et al. | 707/100 |
| 2008/0275891 | A1 * | 11/2008 | Park et al. | 707/100 |
| 2009/0006593 | A1 * | 1/2009 | Cortes | 709/223 |
| 2010/0127900 | A1 * | 5/2010 | Schneider | 341/51 |
| 2010/0318495 | A1 * | 12/2010 | Yan et al. | 707/618 |
| 2012/0166182 | A1 * | 6/2012 | Ko et al. | 704/9 |
| 2013/0013617 | A1 * | 1/2013 | Cai et al. | 707/746 |

FOREIGN PATENT DOCUMENTS

EP    2469423 A1 *    6/2012    .............. G06F 17/30

OTHER PUBLICATIONS

Richter, Jeffrey, "Working with Azure Tables with Multiple Entity Schemas", Retrieved on: Sep. 27, 2011, Available at: http://www.wintellect.com/Articles/Working%20with%20Azure%20Tables%20with%20Multiple%20Entity%20Schemas%20by%20Jeffrey%20Richter.pdf.
"Adaptive Hash Indexes", Retrieved on: Sep. 27, 2011, Available at: http://dev.mysql.com/doc/refman/5.0/en/innodb-adaptive-hash.html.

(Continued)

*Primary Examiner* — Neveen Abel Jalil
*Assistant Examiner* — Matthew Ellis
(74) *Attorney, Agent, or Firm* — Ben Tabor; David Andrews; Micky Minhas (57) ABSTRACT

Embodiments are directed to replicating database tables for efficient data querying and to using a background task to update a database index table on a periodic basis. In one scenario, a computer system accesses an existing, original time-based database table that includes various entities and properties for each entity. Each entity also includes a time stamp value. The computer system receives an indication that the new index table is to be indexed according to a user-specified property and sorts the new index table based on both the value of the user-specified property and the time stamp value of the entity to which the user-specified property belongs. The computer system then periodically copies the entities and associated properties of the original time-based database table into a new database index table.

20 Claims, 4 Drawing Sheets

(56) References Cited

OTHER PUBLICATIONS

"Windows Azure Table", Published on: Dec. 2008, Available at: http://download.microsoft.com/download/3/B/1/3B17OFF4-2354-4B2D-B4DC-8FED5F838F6A/Windows%20Azure%20Table%20-%20Dec%202008.docx.

White, Jim, "Windows Azure Table Storage vs. Windows SQL Azure", Retrieved on: Sep. 28, 2011, Available at: http://www.intertech.com/blog/post/windows-azure-table-storage-vs-windows-sql-azure.aspx.

"Performance of Range Queries on a Windows Azure Table Vs a Normal Database Table", Retrieved on: Sep. 27, 2011, Available at: http://www.infosysblogs.com/microsoft/2011/03/performance_of_range_queries_o.html.

* cited by examiner

EFFICIENT QUERYING USING ON-DEMAND INDEXING OF MONITORING TABLES

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In some cases, software applications are designed to interact with other software applications or other computer systems. For example, a software application may facilitate interaction with a database or other computer server. Such databases store user information, application data and other types of data. This data may be stored for many thousands or even millions of users. Due to the heavy load these databases and other servers are put under, server diagnostics are often performed to determine how efficiently the server or database is operating. This diagnostic data may be taken at periodic intervals and stored in index tables. These index tables can grow quite large over time. Consequently, queries over even relatively small time gaps can be very slow.

BRIEF SUMMARY

Embodiments described herein are directed to replicating database tables for efficient data querying and to using a background task to update a database index table on a periodic basis. In one embodiment, a computer system accesses an existing, original time-based database table that includes various entities and properties for each entity. Each entity also includes a time stamp value. The computer system receives an indication that the new index table is to be indexed according to a user-specified property and sorts the new index table based on both the value of the user-specified property and the time stamp value of the entity to which the user-specified property belongs. The computer system then periodically copies the entities and associated properties of the original time-based database table into a new database index table.

In another embodiment, a background task is used to update a database index table on a periodic basis. A computer system receives a request from a user indicating that a specified property of an entity in a database index table is to be indexed. The computer system generates a task scheduled to run automatically on a defined periodic basis. The task includes a task description that includes the name of the database index table, the name of the property to index, and a delay value. The computer system also initiates the generated task to update the database index table using the scheduled task, according to the task description.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments of the invention may be realized and obtained by means of the instruments and combinations particularly pointed out in the appended claims. Features of the embodiments of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The embodiments of the invention will be described and explained with additional specificity and detail through the use of the accompanying drawings in which.

DETAILED DESCRIPTION

Embodiments described herein are directed to replicating database tables for efficient data querying and to using a background task to update a database index table on a periodic basis. In one embodiment, a computer system accesses an existing, original time-based database table that includes various entities and properties for each entity. Each entity also includes a time stamp value. The computer system receives an indication that the new index table is to be indexed according to a user-specified property and sorts the new index table based on both the value of the user-specified property and the time stamp value of the entity to which the user-specified property belongs. The computer system then periodically copies the entities and associated properties of the original time-based database table into a new database index table.

In another embodiment, a background task is used to update a database index table on a periodic basis. A computer system receives a request from a user indicating that a specified property of an entity in a database index table is to be indexed. The computer system generates a task scheduled to run automatically on a defined periodic basis. The task includes a task description that includes the name of the database index table, the name of the property to index, and a delay value. The computer system also initiates the generated task to update the database index table using the scheduled task, according to the task description.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmissions media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

Figure 1:
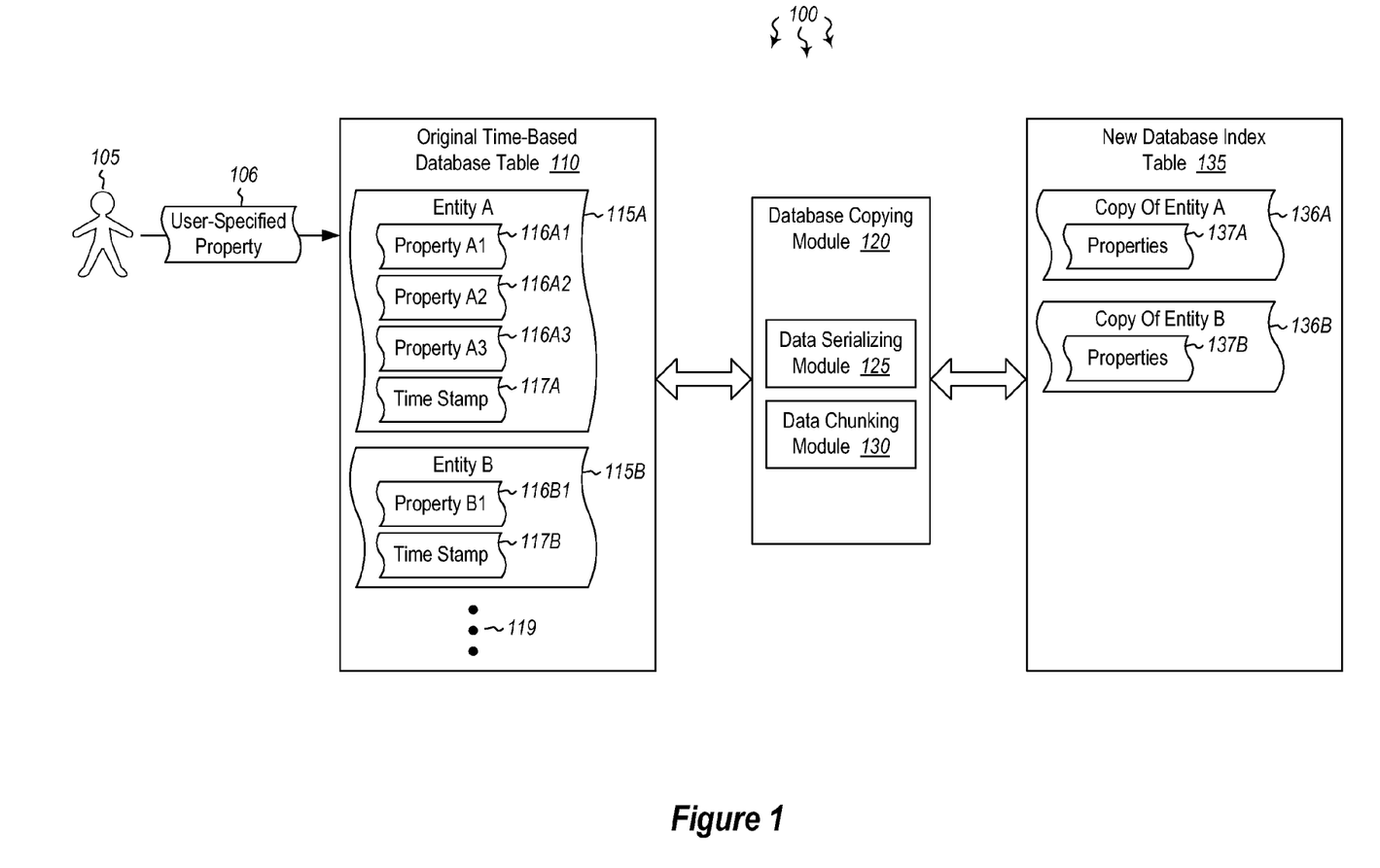
FIG. 1 illustrates a computer architecture in which embodiments of the present invention may operate including replicating database tables for efficient data querying.

FIG. 1 illustrates a computer architecture 100 in which the principles of the present invention may be employed. Computer architecture 100 includes database index tables 110 and 135. Database index table 110 is an existing database that stores multiple different entities and their associated properties. New database index table 135 is a copy of the original time-based database table. The new database index table includes copies of one or more of the entities of the original index table (e.g. copies 136A and 136B). These copies are made by the database copying module 120. These and other modules of FIG. 1 will be incorporated below as various embodiments are described.

In general, embodiments implement dynamically configurable indexes on properties. For a table T (e.g. 110), and a property C (e.g. 116A1) to be indexed, a new table (135) TC is created. In TC, a row may be indexed by the value of C and the time stamp (117A) of the original entity (115A), in that order. Hence, queries over a large time span can be efficiently executed by querying TC.

Because a new table is created for each property that is indexed, additional disk space is used. To reduce the amount of disk space used various compression techniques may be implemented, as will be explained below. Embodiments described herein include at least the following: 1) A string format for serializing entities, 2) An index table format that defines how the indexed data is stored, retrieved, and garbage collected, 3) A background task for continuously updating the index table at a pre-defined interval, 4) A query engine that analyzes the constraints users supply, decides if any indexed table can be queried, and performs the retrieval of the data, and 5) An interface for users to enable and disable indexing of a property in a table. Each of these techniques and implementations will be described below.

1) Serialization and Deserialization of Entities: Entities may be serialized using various different serialization formats. Initially, the database's schema is serialized. Each line of the schema has the name and type of a column separated by comma. Immediately thereafter it is an integer that indicates how many entities exist in the serialization. Next are the entities. Each entity is represented by the values of the columns concatenated in the same order as in the schema section. Each line contains only one column. The serialized string is then compressed to generate a byte array. On deserialization, the byte array is decompressed into a serialized string S. The schema section is retrieved from the beginning of serialized string S, the number of entities is read, and the entities are reconstructed from the remaining part of S.

2) Index Table Format: For table T (110), a new index table (135) is created at periodic intervals (e.g. every day) for each property to be indexed. For example, an index table TC20110909 is created at the beginning of Sep. 9, 2011 for Table T and property C. Tables used for monitoring may have a user-defined retention policy (e.g. 90 days). In the monitoring tables, data that is older than the retention policy is automatically deleted. Because the new index table is no longer ordered by time (as explained further below), at least in some cases, all the data within a time range cannot be efficiently located for deletion. To address this, embodiments described herein create a separate index table every day (or on some other periodic basis). This enables efficient deletion of expired data by deleting entire tables corresponding to the expired time ranges.

In an index table TC20110909 of table T and property C (as in the example above), a "PartitionKey", as used herein, is the concatenation of unique values of C and time stamp. For example, the index table for a new table and property "CounterName" would have PartitionKey to be the concatenation of the unique CounterNames and time stamps. Below is one example, where "________" is used as the separator between the counter name and the time stamp. The time stamp is the tick count (e.g. "\Processor(_Total)\% Processor Time________0634511262000000000").

In some embodiments, each entity in the new index table 135 has one or more data columns that store compressed binary chunks of the entities that have the same value of C. For example, during a five-minute period, there may be 200,000 entities in the new table 135 and 500 unique CounterNames. Embodiments described herein group the entities based on their CounterName column, serialize the entities for each of the 500 unique CounterNames into strings (according to serialization techniques described above), compress the serialized strings, and store the binary chunks in the data columns of the new index table 135. Some data storage solutions allow up to 64 KB per property and 1 MB per entity. As such, an entity in the index table can have up to 15 data columns in that particular storage solution.

When the size of the binary bits is greater than 1 MB, more than one entity in the index table may be used to store the entity. For example, for a given process, there may be two entities in the new index table. A "RowKey" column in a first entity may indicate how many entities in the index table are used to store the binary bits.

Figure 4:
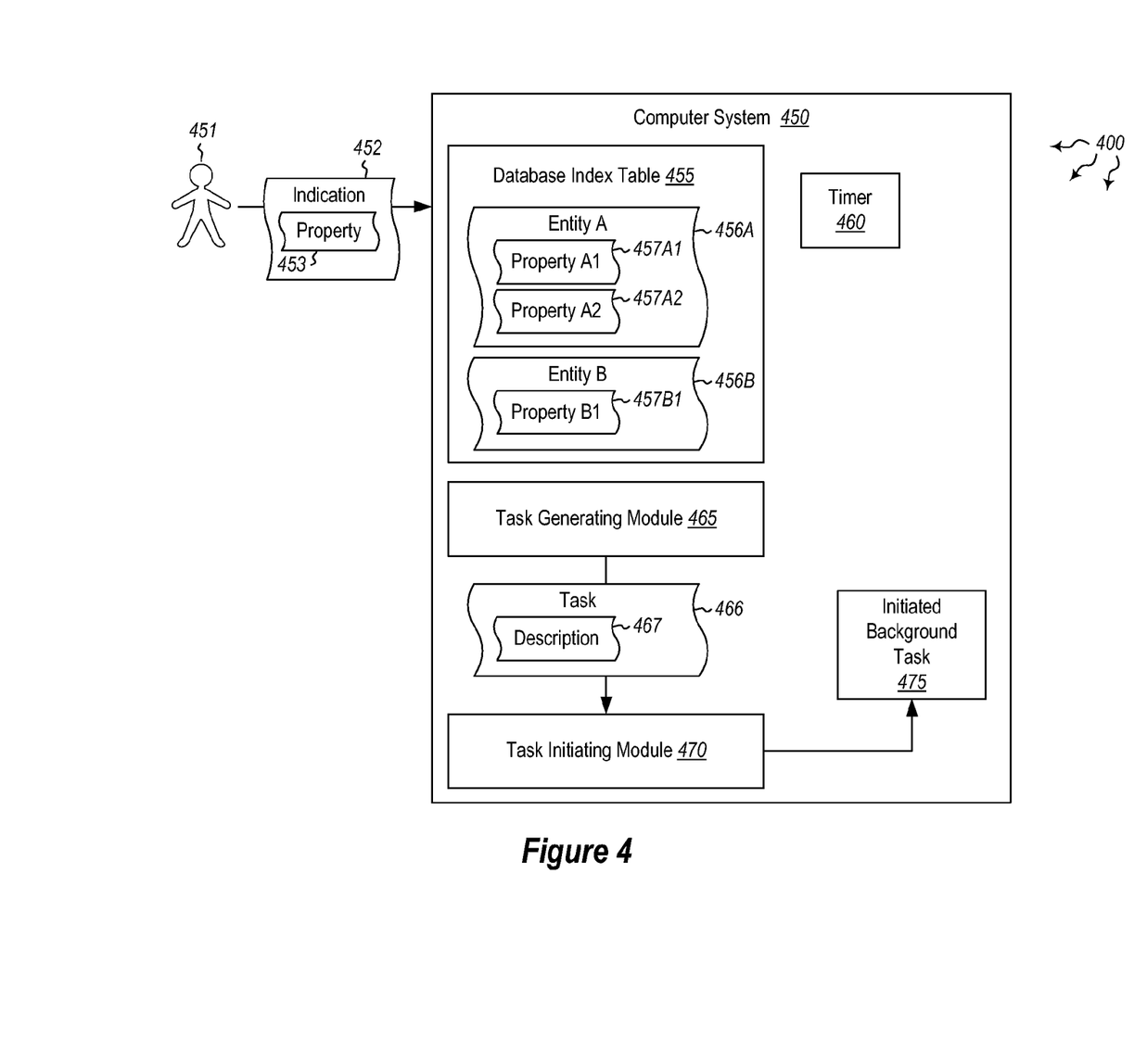
FIG. 4 illustrates an embodiment of the present invention in which a background task is generated to update a database index table.

3) Tasks for Updating the Index Table: FIG. 4 illustrates a task generating module 465 that is configured to generate tasks that are executed on a fixed interval. Embodiments described herein leverage scheduled tasks to update index tables. Upon a user's request to enable indexing of (e.g. property C in table T), the task generating module generates a task scheduled to run on a periodic basis (e.g. every five minutes). Each task 466 includes a task description 467 that itself includes the name of the table, the name of the property, and the delay value of the index task (DELAY). The purpose of the delay is to allow sufficient time for the original (time-based) table 110 to be populated.

Additionally, metadata associated with this new table 135 is updated to indicate that indexing has been enabled for property C. In one example, at each run of an index task, suppose the beginning of the current five-minute interval is TS1. The following actions are performed: 1) Query T with (TS1−DELAY)<=PartitionKey<(TS1+5 minute−DELAY), 2) Group the query results by column C, 3) For entities in each group, perform the following: 3a) Generate the value of the PartitionKey in the index table (as described in Section 2 above), 3b) Serialize the entities into a string (as described in Section 1 above), compress the serialized string, and generate the index entities (Section 2), 4) Generate the per-period (e.g. per-day) index table name (Section 2), 5) Create the index table if it doesn't exist and 6) Write the index entities into the index table.

4) Querying the Index Table: When users (e.g. 105) submit a query on a table, the system decides whether it can take advantage of an existing index table by analyzing the constraints used in the query. If the query includes a predicate on a column that is indexed, an algorithm may be used to query the corresponding index table. Otherwise, the original time-indexed table is queried. At least in some embodiments, the algorithm for querying the index table is as follows: 1) Get the list of per-period (e.g. per-day) index tables that are covered by the time range, 2) For each per-period index table, 2a) Construct the constraint on its PartitionKey, 2b) Query the per-period index table with the ParitionKey constraint, 2c) Reconstruct the compressed serialized string from the index entities, decompress the serialized string, and deserialize the string into the original entities.

5) Interface for Enabling and Disabling Indexing: A user interface may be provided that allows a user to dynamically control indexing. As such, a user may selectively enable or disable indexing for specific columns. In some cases, the user may enable indexing only on columns that users are most likely query on. This interface supports an application programming interface (API) that lets users turn on and turn off indexing for a given table and column on demand. These concepts will be explained further below with regard to methods 200 and 300 of FIGS. 2 and 3, respectively.

Figure 2:
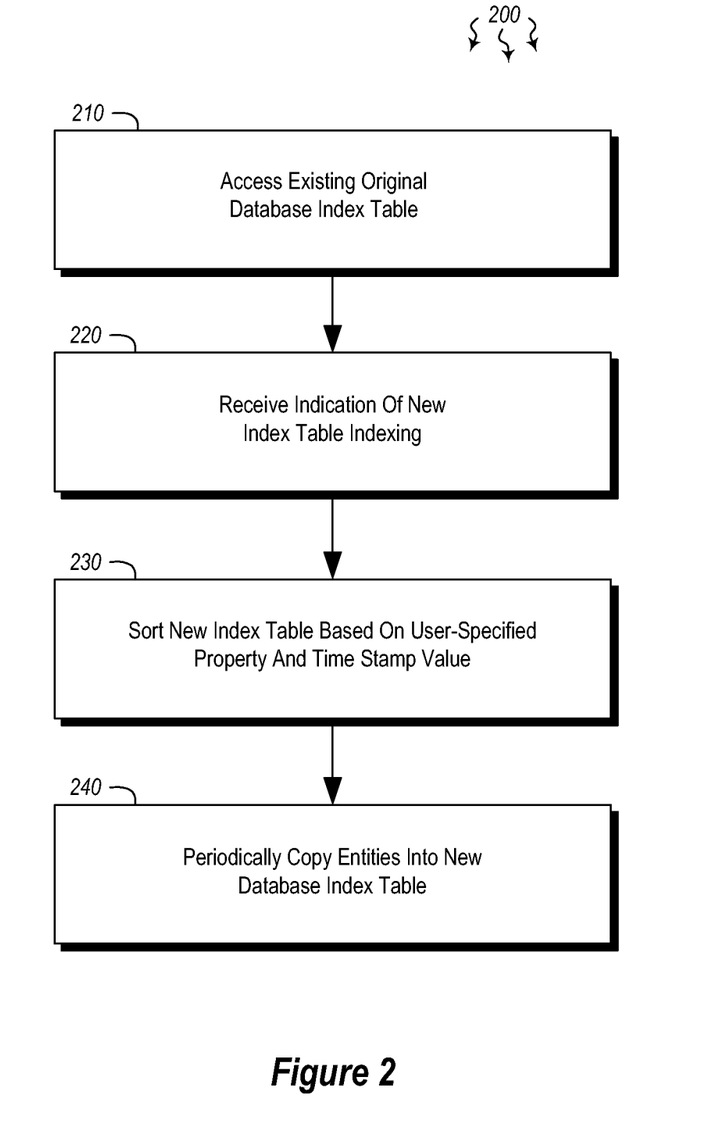
FIG. 2 illustrates a flowchart of an example method for replicating database tables for efficient data querying.
Figure 3:
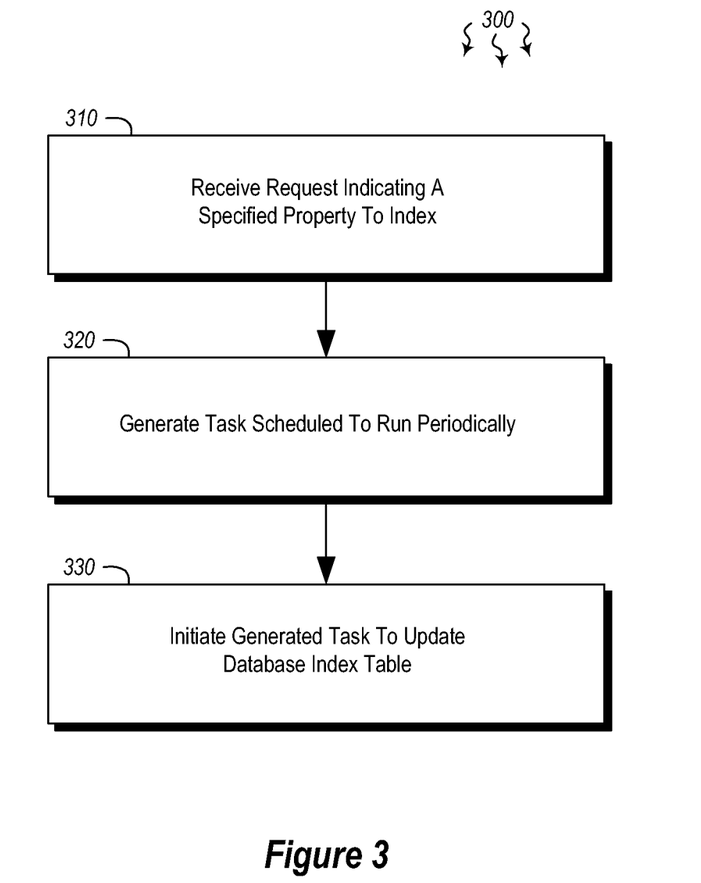
FIG. 3 illustrates a flowchart of an example method for using a background task to update a database index table on a periodic basis.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for replicating database tables for efficient data querying. The method 200 will now be described with frequent reference to the components and data of environment 100.

Method 200 includes an act of accessing an existing, original time-based database table that includes one or more entities and one or more properties for each entity, each entity including a time stamp value (act 210). For example, original time-based database table 110 may be accessed by a computer system or a computer system user (e.g. 105). The original time-based database table may be any type of database index table and may include various entities and entity properties. For instance, table 110 includes entity A (115A) that has properties A1 (116A1), A2 (116A2) and A3 (116A3). Entity A also includes a time stamp 117A. Similarly, entity B (115B) includes property B1 (116B1) and time stamp 117B. It will be understood that original time-based database table may include substantially any number of entities (as indicated by ellipses 119), and that each entity may include substantially any number of properties. Each entity in the database index table includes a time stamp indicating its time of creation or time of last modification.

Method 200 also includes an act of receiving an indication that a new index table is to be indexed according to a user-specified property (act 220). For example, user 105 may send an indication with a user-specified property 106 on which the new index table 135 is to be indexed. The user-specified property includes a specified column by which the entities are to be sorted. For instance, entities may be grouped based on the entities' associated CounterName column. The entities in the new index table may thus be sorted based on a partition key comprising the CounterName concatenated with the time stamp. Thus, as indicated in FIG. 2, the new index table is sorted based on both the value of the user-specified property 106 (e.g. property A1) and the time stamp value 117A of the entity 115A to which the user-specified property belongs (act 230).

In some cases, a user may send a request to query for a given value over a time period specified by the user (e.g. over an hour, a day, a week, a month, etc.). The request may be received at the original time-based database table 110 and may be carried out over the new database index table 135. The results of the query may then return each occurrence of the user-specified value over the user-defined time period. In this manner, a user can query for values over long ranges of time in an efficient manner. Creation of a new database index table on a defined periodic basis may further allow expired data to be deleted in an efficient manner. The expired data may be deleted by deleting those database index tables that correspond to expired time ranges. Thus, queries and deletions may be processed quickly and efficiently using the new database index table, as described above.

Method 200 next includes an act of periodically copying the entities and associated properties of the original time-based database table into a new database index table (act 240). For example, data copying module 120 may periodically copy one or more of the entities in the original time-based database table to the new database index table 135. The new database index table thus includes copies of entities A, B and any other entities that are part of the original time-based database table. Although not explicitly listed in FIG. 1, each entity copy includes the same properties that were in the original entity. Thus, copy of entity A (136A) includes properties 137A which include properties A1, A2 and A3. Similarly, copy of entity B (136B) includes properties 137B which include property B1.

As explained above, the entities may be serialized by data serializing module 125. The serialization may be performed by any of a plurality of serialization techniques. The entities are serialized into strings for storage in the new index table 135. Serialization allows the data to be transferred between indexes in a logical manner. The data is deserialized upon reaching the destination. The serialized strings of the entities and associated properties are compressed when copied into the new index table. Various different types of compression methods may be used. The serialized, compressed strings of entities and associated properties may be broken into chunks of a specified size by data chunking module 130. The data chunks of serialized data may then be stored in the new database index table 135.

In some embodiments, the entities (e.g. 115A) and their associated properties (e.g. 116A1-A3) are copied from the original time-based database table 110 to the new index table 135 at a user-specified interval. For instance, the user 105 may indicate that the entities of the original database may be copied on a hourly, daily, weekly or other periodic basis. The user-initiated periodic copying may be carried out using processing tasks. Each task 466 includes a task definition 467 that comprises the name of the original time-based database table, the name of the property to be copied to the new database index table (e.g. user-specified property 106) and a specified time delay for the task. As indicated above, the specified time delay allows sufficient time for the original (time-based) database index table to be populated. Metadata associated with the original time-based database table may be updated to indicate that indexing has been enabled for a specified property (such as the user-specified property).

FIG. 3 illustrates a flowchart of a method 300 for using a background task to update a database index table on a periodic basis. The method 300 will now be described with frequent reference to the components and data of environment 400 of FIG. 4.

Method 300 includes an act of receiving a request from a user indicating that a specified property of an entity in a database index table is to be indexed (act 310). Computer system 450 may receive indication 452 from user 451 indicating that the property 453 specified by the user is to be indexed in database index table 455. In response to the received user indication, the task generating module 465 generates a task 466 scheduled to run automatically on a defined periodic basis. The task includes a task description 467 that includes the name of the database index table, the name of the property to index, and a delay value (act 320). The delay value may be implemented according to the delay value specified in the task description. This delay allows sufficient time for the original, time-based database index (110) table to be populated.

Method 300 further includes an act of initiating the generated task to update the database index table using the scheduled task, according to the task description (act 330). For instance, task initiating module 470 may initiate background task 475 to update the database index table 455. Updating the database index table includes updating the entities and their properties. Thus, as shown in FIG. 4, entity A (456A) and its associated properties A1 (457A1) and A2 (457A2), as well as entity B (456B) and its associated property B1 (457B1) may be updated by the scheduled background task. The background task may be scheduled to run on a user-specified periodic basis. The background task may use timer 460 to determine how long it has been since the last update, and how long it will be until the next update is initiated. The database index table may also update metadata associated with the database index table to indicate that indexing has been enabled or disabled for a certain period of time and/or for a certain property which is to be indexed. A user interface may be provided to allow modification of the task, as well as enabling or disabling indexing for a specific property. The user interface may further allow a user to select a column to sort by and/or enable or disable indexing for a specified column (or property value).

Accordingly, methods, systems and computer program products are provided which replicate database tables to facilitate efficient data querying. Moreover, methods, systems and computer program products are provided which use a background task to update a database index table on a periodic basis.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a computer system including at least one processor and a memory, in a computer networking environment including a plurality of computing systems, a computer-implemented method for replicating database tables for efficient data querying, the method comprising:

an act of accessing an existing, original time-based database table that includes a plurality of rows and one or more columns, each row being assigned a corresponding time stamp, the plurality of rows being sorted within the time-based database table according the corresponding time stamp of each row;

an act of receiving an indication that an index table, corresponding to the time-based database table, is to be indexed according to a user-specified index column selected from among the one or more columns; and an act of copying at least a portion of each of the plurality of rows of the time-based database table into the index table, the index table including a plurality of index table rows that are each assigned a corresponding partition key, the plurality of index table rows being sorted according to partition key, wherein copying the plurality of rows of the time-based database table into the index table includes, for each of the plurality of rows of the time-based database table:

concatenating the corresponding time stamp of each row with a value of the corresponding user-specified index column that corresponds to the row; and storing at least a portion of data of the row within a corresponding index table row of the plurality of index table rows, the corresponding index table row having a value comprising the corresponding partition key for the index table row that comprises the concatenation of the corresponding time stamp of the row with the value of the corresponding user-specified index column that corresponds to the row, wherein storing at least a portion of data of the row within a corresponding index table row of the plurality of index table rows includes:

determining that two or more rows of the plurality of rows of the time-based database table have the same column value for the user-specified index column;

generating a serialized string for the two or more rows that have the same column value for the user-specified index column;

compressing the serialized string to generate a binary chunk for the two or more rows that have the same column value for the user-specified index column; and storing the binary chunk within a column entry of the corresponding index table row.

2. The method of claim 1, wherein the user-specified index column comprises a specified column by which the rows are to be sorted.

3. The method of claim 1, further comprising:
receiving a request from a user querying for a particular column value over a user-defined time period; and
returning each occurrence of the column value over the user-defined time period based on querying the index table.

4. The method of claim 1, wherein the plurality of rows and their associated columns are copied from the original time-based database table to the index table at a user-specified interval using processing tasks.

5. The method of claim 4, wherein each task includes a task definition that comprises the name of the original time-based database table, the name of the column to be copied to the index table and a specified time delay for the task.

6. The method of claim 5, wherein the specified time delay allows sufficient time for the original time-based database table to be populated.

7. The method of claim 6, wherein metadata associated with the original time-based database table is updated to indicate that indexing has been enabled for a specified column.

8. The method of claim 1, wherein the creation of the index table on a defined periodic basis allows expired data to be deleted by deleting those index tables that correspond to expired time ranges.

9. The method of claim 1, wherein concatenating the corresponding time stamp of each row with a value of the corresponding user-specified index column that corresponds to the row comprises inserting one or more characters between the corresponding time stamp and the value.

10. A computer system, comprising:
one or more hardware processors; and
one or more computer-readable media having stored thereon computer-executable instructions that, when executed by the one or more hardware processors, cause the computer system to implement a method for replicating database tables for efficient data querying, the method comprising:

an act of accessing an existing, original time-based database table that includes a plurality of rows and one or more columns, each row being assigned a corresponding time stamp, the plurality of rows being sorted within the time-based database table according the corresponding time stamp of each entity;

an act of receiving an indication that an index table, corresponding to the time-based database table, is to be indexed according to a user-specified index column selected from among the one or more columns; and an act of copying at least a portion of each of the plurality of rows of the time-based database table into the index table, the index table including a plurality of index table rows that are each assigned a corresponding partition key, the plurality of index table rows being sorted according to partition key, wherein copying the plurality of rows of the time-based database table into the index table includes, for each of the plurality of rows of the time-based database table:

concatenating the corresponding time stamp of each row with a value of the corresponding user-specified index column that corresponds to the row; and storing at least a portion of data of the row within a corresponding index table row of the plurality of index table rows, the corresponding index table row having a value comprising the corresponding partition key for the index table row that comprises the concatenation of the corresponding time stamp of the row with the value of the corresponding user-specified index column that corresponds to the row, wherein storing at least a portion of data of the row within a corresponding index table row of the plurality of index table rows includes:

determining that two or more rows of the plurality of rows of the time-based database table have the same column value for the user-specified index column;

generating a serialized string for the two or more rows that have the same column value for the user-specified index column;

compressing the serialized string to generate a binary chunk for the two or more rows that have the same column value for the user-specified index column; and storing the binary chunk within a column entry of the corresponding index table row.

11. The computer system of claim 10, further comprising:
receiving a request from a user querying for a particular column value over a user-defined time period; and
returning each occurrence of the column value over the user-defined time period based on querying the index table.

12. The computer system of claim 10, wherein the plurality of rows and their associated columns are copied from the original time-based database table to the index table at a user-specified interval using processing tasks.

13. The computer system of claim 10, wherein the creation of the index table on a defined periodic basis allows expired data to be deleted by deleting those index tables that correspond to expired time ranges.

14. One or more non-volatile computer storage devices having stored thereon computer-executable instructions that, when executed by one or more processor of a computer system, cause the computer system to implement a method for replicating database tables for efficient data querying, the method comprising:
an act of accessing an existing, original time-based database table that includes a plurality of rows and one or more columns, each row being assigned a corresponding time stamp, the plurality of rows being sorted within the time-based database table according the corresponding time stamp of each row;
an act of receiving an indication that an index table, corresponding to the time-based database table, is to be indexed according to a user-specified index column selected from among the one or more columns; and
an act of copying at least a portion of each of the plurality of rows of the time-based database table into the index table, the index table including a plurality of index table rows that are each assigned a corresponding partition key, the plurality of index table rows being sorted according to partition key, wherein copying the plurality of rows of the time-based database table into the index table includes, for each of the plurality of rows of the time-based database table:
concatenating the corresponding time stamp of each row with a value of the corresponding user-specified index column that corresponds to the row; and
storing at least a portion of data of the row within a corresponding index table row of the plurality of index table rows, the corresponding index table row having a value comprising the corresponding partition key for the index table row that comprises the concatenation of the corresponding time stamp of the row with the value of the corresponding user-specified index column that corresponds to the row, wherein storing at least a portion of data of the row within a corresponding index table row of the plurality of index table rows includes:
determining that two or more rows of the plurality of rows of the time-based database table have the same column value for the user-specified index column;
generating a serialized string for the two or more rows that have the same column value for the user-specified index column;
compressing the serialized string to generate a binary chunk for the two or more rows that have the same column value for the user-specified index column; and
storing the binary chunk within a column entry of the corresponding index table row.

15. One or more non-volatile computer storage devices of claim 14, wherein the user-specified index column comprises a specified column by which the rows are to be sorted.

16. One or more non-volatile computer storage devices of claim 14, further comprising:
receiving a request from a user querying for a particular column value over a user-defined time period; and
returning each occurrence of the column value over the user-defined time period based on querying the index table.

17. One or more non-volatile computer storage devices of claim 14, wherein the plurality of rows and their associated columns are copied from the original time-based database table to the index table at a user-specified interval using processing tasks.

18. One or more non-volatile computer storage devices of claim 17, wherein each task includes a task definition that comprises the name of the original time-based database table, the name of the column to be copied to the index table and a specified time delay for the task.

19. One or more non-volatile computer storage devices of claim 18, wherein the specified time delay allows sufficient time for the original time-based database table to be populated.

20. One or more non-volatile computer storage devices of claim 6, wherein metadata associated with the original time-based database table is updated to indicate that indexing has been enabled for a specified column.

* * * * *